United States Patent
Arora et al.

(10) Patent No.: US 8,920,919 B2
(45) Date of Patent: Dec. 30, 2014

(54) THERMAL INTERFACE MATERIAL COMPOSITION INCLUDING POLYMERIC MATRIX AND CARBON FILLER

(71) Applicants: Hitesh Arora, Chandler, AZ (US); James C. Matayabas, Jr., Chandler, AZ (US)

(72) Inventors: Hitesh Arora, Chandler, AZ (US); James C. Matayabas, Jr., Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 34 days.

(21) Appl. No.: 13/625,612

(22) Filed: Sep. 24, 2012

(65) Prior Publication Data

US 2014/0087200 A1    Mar. 27, 2014

(51) Int. Cl.
    *B32B 27/32*     (2006.01)

(52) U.S. Cl.
    USPC ............................ 428/323; 428/523; 524/578

(58) Field of Classification Search
None
See application file for complete search history.

(56) References Cited

U.S. PATENT DOCUMENTS

| | | | |
|---|---|---|---|
| 6,469,379 B1 | 10/2002 | Matayabas, Jr. et al. | |
| 6,597,575 B1 | 7/2003 | Matayabas, Jr. et al. | |
| 6,924,027 B2 | 8/2005 | Matayabas, Jr. et al. | |
| 6,936,653 B2 * | 8/2005 | McElrath et al. | 524/496 |
| 6,974,728 B2 | 12/2005 | Matayabas, Jr. et al. | |
| 7,030,483 B2 | 4/2006 | Matayabas, Jr. et al. | |
| 7,060,747 B2 | 6/2006 | Matayabas, Jr. et al. | |
| 7,126,215 B2 | 10/2006 | Koning et al. | |
| 7,170,188 B2 | 1/2007 | Matayabas, Jr. et al. | |
| 7,224,050 B2 | 5/2007 | Matayabas, Jr. et al. | |
| 7,332,797 B2 | 2/2008 | Matayabas, Jr. et al. | |
| 7,408,787 B2 | 8/2008 | Matayabas, Jr. et al. | |
| 7,417,111 B2 | 8/2008 | Matayabas, Jr. et al. | |
| 7,446,360 B2 | 11/2008 | Matayabas, Jr. et al. | |
| 7,465,605 B2 | 12/2008 | Raravikar et al. | |
| 7,534,649 B2 | 5/2009 | Lehman, Jr. et al. | |
| 7,666,768 B2 | 2/2010 | Raravikar et al. | |
| 7,744,802 B2 | 6/2010 | Matayabas, Jr. et al. | |
| 7,927,925 B2 | 4/2011 | Chakrapani et al. | |
| 7,952,212 B2 | 5/2011 | Chakrapani et al. | |
| 7,999,042 B2 | 8/2011 | Matayabas, Jr. et al. | |
| 8,158,968 B2 | 4/2012 | Raravikar et al. | |
| 2003/0168731 A1 | 9/2003 | Matayabas, Jr. et al. | |
| 2005/0061496 A1 | 3/2005 | Matabayas, Jr. et al. | |
| 2005/0269726 A1 | 12/2005 | Matabayas, Jr. et al. | |
| 2007/0135550 A1 | 6/2007 | Chakrapani et al. | |
| 2008/0237841 A1 | 10/2008 | Arana et al. | |
| 2008/0237843 A1 | 10/2008 | Gupta et al. | |

* cited by examiner

*Primary Examiner* — Sheeba Ahmed
(74) *Attorney, Agent, or Firm* — Konrad Raynes Davda & Victor LLP; Alan S. Raynes

(57) ABSTRACT

Certain embodiments relate to compositions that may be used as thermal interface materials in electronic assemblies. One such composition includes a block copolymer matrix comprising polystyrene and polybutene. The composition also includes a filler positioned in the copolymer matrix, the filler comprising carbon. The filler may in certain embodiments be a material selected from the group consisting of graphite, graphene, and carbon nanotubes. composition may include routing structures and their formation. Assemblies may include the composition positioned between a die and a heat spreader. Other embodiments are described and claimed.

22 Claims, 3 Drawing Sheets

THERMAL INTERFACE MATERIAL COMPOSITION INCLUDING POLYMERIC MATRIX AND CARBON FILLER

RELATED ART

Electronic devices are often formed with a thermal interface material positioned between components such as a semiconductor die and a heat spreading structure (known as a heat spreader) such as a copper body adapted to conduct heat away from the semiconductor die. The thermal interface material acts to transfer heat from the semiconductor die to the heat spreader. Thermal interface materials may be chosen to be somewhat compliant to ensure optimal contact with the die and the heat spreader. Materials including metals such as solders, greases, and thermally conductive polymer systems including a silicone or epoxy matrix with thermally conductive particles therein, have been utilized as thermal interface materials.

BRIEF DESCRIPTION OF THE DRAWINGS

Embodiments are described by way of example, with reference to the accompanying drawings, which are not drawn to scale.

DETAILED DESCRIPTION

In order to show features of various embodiments most clearly, the drawings included herein include a representation of various electronic and/or mechanical devices. The actual appearance of the fabricated structures may appear different while still incorporating the claimed structures of the illustrated embodiments. Moreover, the drawings may show only the structures necessary to understand the illustrated embodiments. Additional structures known in the art have not been included to maintain the clarity of the drawings.

Certain embodiments relate to the formation and use of a thermal interface material including a polymeric, matrix and thermally conductive filler therein. The polymeric matrix may in certain embodiments include a polystyrene component and a polybutene component. The thermally conductive filler may in certain embodiments include graphite or other forms of carbon. The thermal interface material may be used in the formation of various electronic assemblies.

Figure 1:
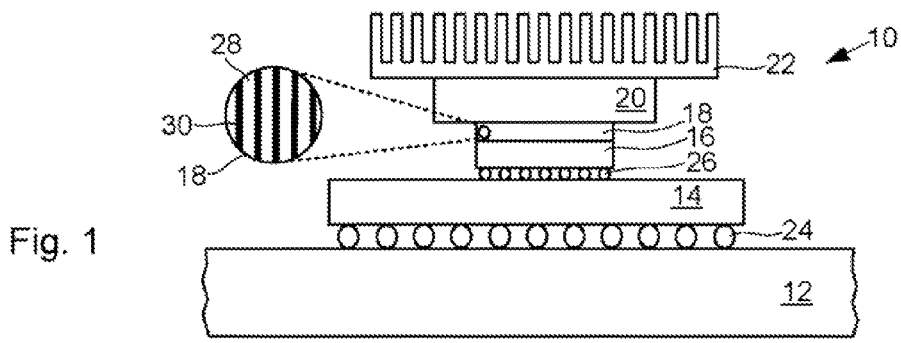
FIG. 1 is a view of an assembly including a thermal interface material positioned between a die and a heat spreader, in accordance with certain embodiments.

FIG. 1 illustrates an assembly 10 in accordance with certain embodiments, including a board 12 such as a printed circuit board on which a substrate 14 is positioned. A die 16 is positioned on the substrate 14. A thermal interface material 18 is positioned on the die 16, and a heat spreader 20 is positioned on the thermal interface material 18 to transmit heat away from the die 16. The thermal interface material 18 is illustrated as extending to the side edges of the die 16. In certain embodiments, the thermal interface material 18 may extend slightly beyond the side edges of the die 16. The heat spreader 20 is a structure that conducts heat away from the die and may have a variety of structures including, but not limited to, a metal plate. The heat spreader may alternatively take the form of a lid. A heat sink structure 22 with fins may optionally be positioned on the heat spreader 20 to further dissipate heat from the assembly. In certain embodiments a heat spreader may be integral with a heat sink structure such as the heat sink structure 22. The die 16 may be coupled to the substrate 14 using any suitable connection including, but not limited to, solder bumps 26. The substrate 14 may be coupled to the board 12 using any suitable connection including, but not limited to, solder bumps 24. As illustrated in the blown-up portion of FIG. 1, the thermal interface material 18 may include a matrix material 28 and a filler material 30. In certain embodiments, the matrix material 28 comprises polymeric materials including polystyrene and polybutene. These materials inhibit heat and moisture induced cross-linking and oxidation, and provide a suitable connection to the die 16 and heat spreader 20 for heat transfer through the thermal interface material to take place. In certain embodiments, the thermally conductive filler material comprises carbon, including, but not limited to, carbon in the graphite form, which may take a variety of shapes including, but not limited to, particles, whiskers, and fibers.

Figure 2:
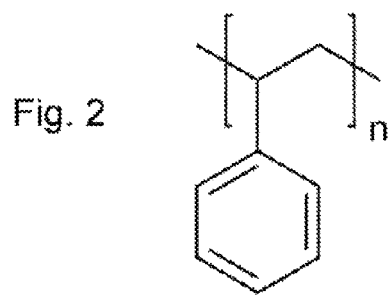
FIG. 2 is a view of a polystyrene chain as a structural component in a formulation of a thermal interface material, in accordance with certain embodiments.

As noted above, in certain embodiments, the thermal interface material may include a matrix comprising polystyrene and polybutene. FIG. 2 illustrates a representation of a polymer chain of polystyrene, which has a linear formula of $[CH_2CH(C_6H_5)]_n$, where n is the number of repeating units. The number n represents the degree of polymerization and is typically in the range of about 10 to 10000 (through n may be any number greater than or equal to 1). As illustrated, the polystyrene includes a ring structure.

Figure 3:
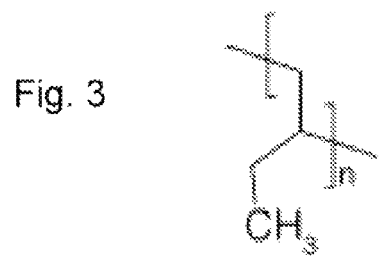
FIG. 3 is a view of a polybutene chain as a structural component in a formulation of a thermal interface material, in accordance with certain embodiments.
Figure 4:
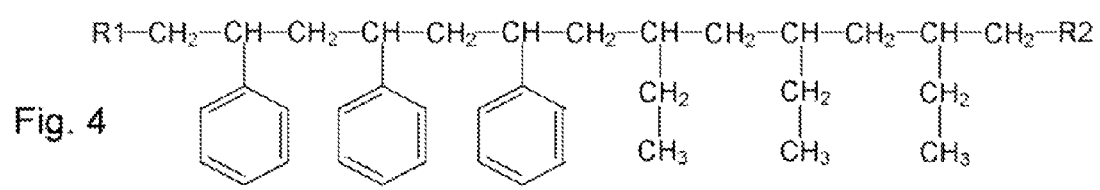
FIG. 4 is a view of a block copolymer including polystyrene and polybutene as a matrix component in a formulation of a thermal interface material, in accordance with certain embodiments.

FIG. 3 illustrates a representation of polybutene, which has a formula of $[C_4H_8]_n$, wherein n is the number of repeating units. The number n represents the degree of polymerization and is typically in the range of about 10 to 10000 (through n may be any number greater than or equal to 1). FIG. 4 is a representation of a copolymer of polystyrene and polybutene, illustrating three units of polystyrene and R1, which represents an additional number of polystyrene units, on the left side of the figure, and three units of polybutene and R2, which represents an additional number of polybutene units.

Figure 5A:
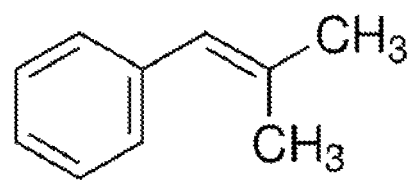
FIGS. 5(A)-5(D) are views of derivatives of styrene which may be used as a structural component in a formulation of a thermal interface material, in accordance with certain embodiments.
Figure 5B:
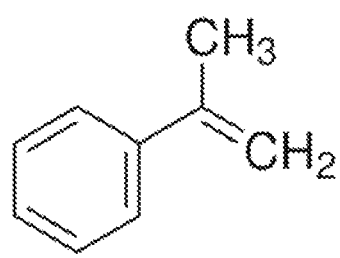
Figure 5C:
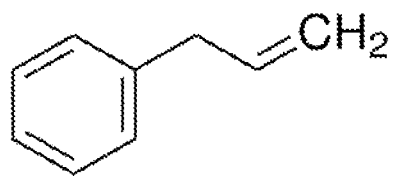
Figure 5D:
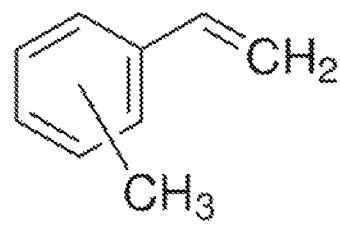

Certain embodiments may include materials other than polystyrene and polybutene. In particular, certain embodiments may utilize derivatives of styrene. One example of a derivative of styrene is 2-methyl-1-phenyl-1-propene (also known as (2-methylpropenyl)benzene, which has a linear formula of $C_6H_5CH=C(CH_3)_2$. FIG. 5(A) illustrates a representation of 2-methyl-1-phenyl-1-propene. Another derivative of styrene is α-methylstyrene (also known as 2-phenylpropene or isopropenylbenzene), which has a linear formula of $C_6H_5C(CH_3)=CH_2$. FIG. 5(B) illustrates a representation of α-methylstyrene. Another derivative of styrene is allylbenzene (also known as 3-phenyl-1-propene), which has a linear formula of $C_6H_5CH_2CH=CH_2$. FIG. 5(C) illustrates a representation of allylbenzene, Still another derivative of styrene is methylstyrene (also known as vinyltoluene), which has a linear formula of $CH_3C_6H_4CH=CH_2$. FIG. 5(D) illustrates a representation of methylstyrene. Other styrene derivatives may also find application is certain embodiments.

In certain embodiments the polystyrene and polybutene are present as a block copolymer. In the block copolymer, the polystyrene and polybutene are joined through a covalent bond. Other embodiments may include a non-block copolymer mixture of polystyrene and polybutene in which there is no chemical bond therebetween. It is believed that better miscibility between polymers is obtained when the polystyrene and polybutene are present as a block copolymer.

It is believed that the polystyrene provides thermal stability and moisture resistance. It is believed that the polybutene provides tackiness which enables the formation of a good bond to other components that matrix material is in contact with (for example, a die and a heat spreader). In certain embodiments the polystyrene and polybutene are each present in the matrix in an amount in the range of about 20 to 80 volume percent. Depending on the desired properties, the quantities of the polystyrene and polybutene may be varied, for example, to achieve greater thermal and moisture resistance, more polystyrene may be used, and to achieve a better bond with the die and/or heat spreader, more polybutene may be used. Certain preferred embodiments include polystyrene and polybutene each present in the matrix in an amount ranging from about 40 to about 60 volume percent. Small quantities of suitable additives may also be present in the matrix, including, but not limited to, coupling agents Examples of additives include, but are not limited to, epoxies and silanes.

The filler material in the thermal interface material may be selected to provide enhanced thermal properties. A variety of filler materials may be used in embodiments, including, but not limited to, metals and ceramics. The filler may be present in any number of forms, including, but not limited to, particles, fibers, and whiskers. Certain preferred fillers include carbon based materials. Suitable carbon based materials include, but are not limited to, graphite, graphene, and carbon nanotube (CNT) structures. In certain embodiments the carbon based filler is present in the form of fibers (or rods) that are aligned in the matrix so that when the thermal interface material is positioned between a die and a heat spreader, the fibers extend from the die end of the TIM to the heat spreader end of the TIM. Such an oriented fiber may be referred as vertically aligned. In other embodiments the filler may be randomly oriented within the matrix. It has been observed that polystyrene has an affinity for carbon based materials, including graphite, and as a result a good bond between the matrix and the filler may be achieved.

In certain embodiments the filler may be present in the TIM in an amount of about 10 to 70 volume percent, with certain preferred embodiments including about 30-50 volume percent. Any suitable processing operations may be used to manufacture the matrix and filler and to combine the matrix and filler in certain embodiments, the matrix material and filler particles can be formed using a suitable extruding process.

Figure 6:
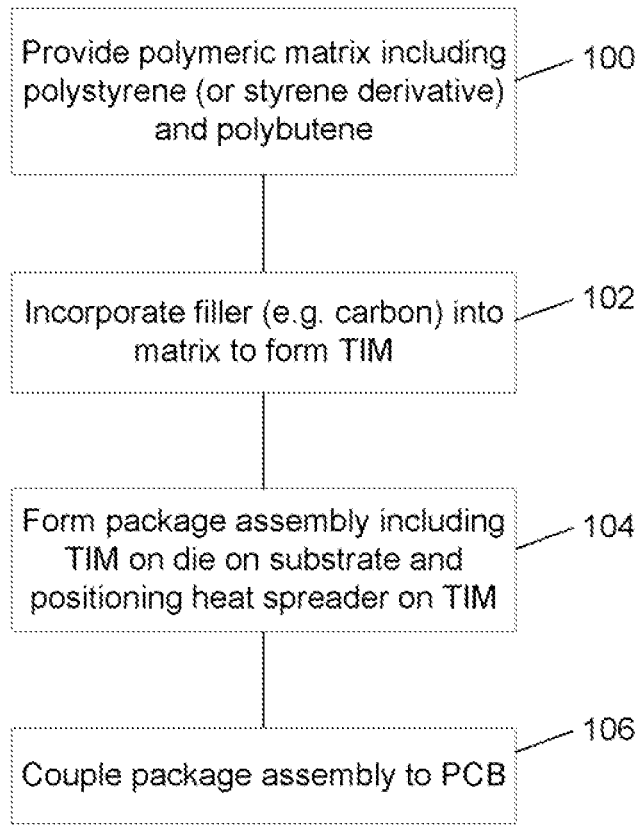
FIG. 6 is a flow chart of operations for forming an electronic assembly, in accordance with certain embodiments.

FIG. 6 illustrates a flowchart of operations for forming an electronic assembly in accordance with certain embodiments, Box 100 is providing a polymeric matrix material including (i) polystyrene or a styrene derivative, and (ii) polybutene. The polymeric matrix material may in certain embodiments comprise a block copolymer including polystyrene or one or more styrene derivatives as a first component, and polybutene as a second component. Box 102 is incorporating a filler material into the matrix material, to form the thermal interface material (TIM). The filler material may in certain embodiments be a carbon based material such as graphite. Box 104 is forming a package assembly including a package substrate to which a die is coupled, positioning the TIM on the die, and positioning a heat spreader on the TIM, so that heat generated can be transferred from the die to the heat spreader through the TIM. Box 106 is coupling the package assembly including the TIM and heat spreader to a printed circuit board such as a motherboard. Various modifications to the operations may be made.

Figure 7:
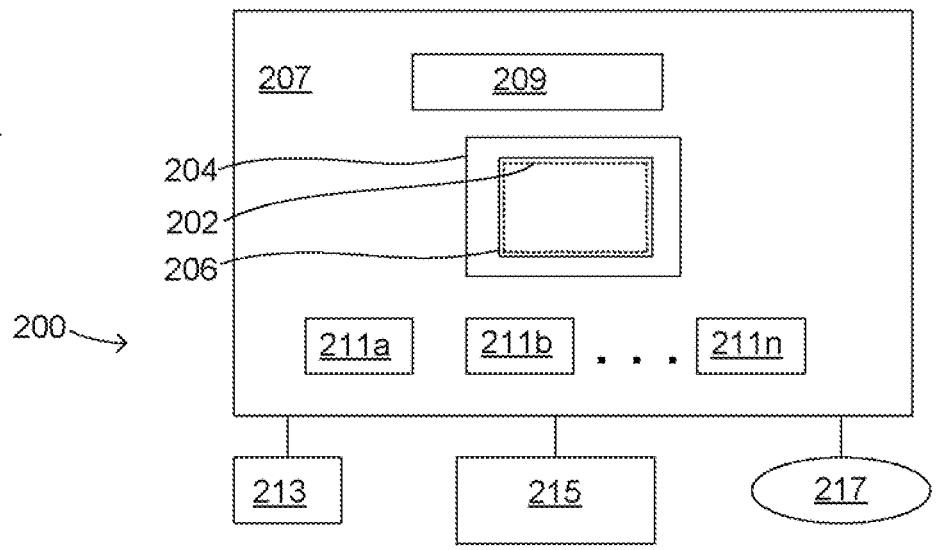
FIG. 7 illustrates an electronic system arrangement in which embodiments may find application.

Assemblies including structures formed as described in embodiments above may find application in a variety of electronic components. FIG. 7 schematically illustrates one example of an electronic system environment in which aspects of described embodiments may be embodied. Other embodiments need not include all of the features specified in FIG. 7, and may include alternative features not specified in FIG. 7.

The system 200 of FIG. 7 may include at least one central processing unit (CPU) 202 (also known as a microprocessor) coupled to a package substrate 204. As illustrated in FIG. 7. the CPU 202 is indicated by a dotted line. A heat spreader 206 is positioned on the CPU 202, with a thermal interface material such as described in embodiments above being positioned between the CPU 202 and the heat spreader 206. The package substrate 204 may be coupled to a printed circuit board 207 (for example, a motherboard). A variety of other system components, including, but not limited to memory and other components described below, may also include structures formed in accordance with embodiments such as described above.

The system 200 may further include memory 209 and one or more controllers 211a, 211b . . . 211n, which are also disposed on the printed circuit hoard 207. The printed circuit board 207 may in certain embodiments be a single layer or multi-layered board which has a plurality of conductive lines that provide communication between the circuits in the package 204 and other components mounted to the board 207. Alternatively, one or more of the CPU 202, memory 209 and controllers 211a, 211b . . . 211n may be disposed on other cards such as daughter cards or expansion cards. The CPU 202, memory 209 and controllers 211a, 211b . . . 211n may each be seated in sockets or may be connected directly to a printed circuit board or all integrated in the same package. A display 215 may also be included.

Any suitable operating system and various applications execute on the CPU 202 and reside in the memory 209. The content residing in memory 209 may be cached in accordance with known caching techniques. Programs and data in memory 209 may be swapped into storage 213 as part of memory management operations. The system 200 may comprise any suitable computing device, including, but not limited to, a mainframe, server, personal computer, smart phone, workstation, laptop, handheld computer, netbook, tablet, book reader, handheld gaming device, handheld entertainment device (for example, MP3 (moving picture experts group layer audio) player), PDA (personal digital assistant) telephony device (wireless or wired), network appliance, virtualization device, storage controller, network controller, router, etc.

The controllers 211a, 211b . . . 211n may include one or more of a system controller, peripheral controller, memory controller, hub controller, I/O (input/output) bus controller, video controller, network controller, storage controller, communications controller, etc. For example, a storage controller can control the reading of data from and the writing of data to the storage 213 in accordance with a storage protocol layer. The storage protocol of the layer may be any of a number of known storage protocols. Data being written to or read from the storage 213 may be cached in accordance with known caching techniques. A network controller can include one or more protocol layers to send and receive network packets to and from remote devices over a network 217. The network 217 may comprise a Local Area Network (LAN), the Internet, a Wide Area Network (WAN), Storage Area Network (SAN), etc. Embodiments may be configured to transmit and receive data over a wireless network or connection. In certain embodiments, the network controller and various protocol layers may employ the Ethernet protocol over unshielded twisted pair cable, token ring protocol, Fibre Channel protocol, etc., or any other suitable network communication protocol.

It should be appreciated that many changes may be made within the scope of the embodiments described herein. For example, a die to which the TIM may be positioned on may be formed from silicon or other materials, including, but not limited to, other semiconductors including, but not limited to, gallium arsenide. A through-silicon-via is an example of a through-semiconductor-via extending through silicon. The term die as used herein refers to a workpiece that is transformed by various process operations into a desired electronic device. A die is usually singulated from a wafer, and wafers may be made of semiconducting, non-semiconducting, or combinations of semiconducting and non-semiconducting materials.

Terms such as "first", "second", and the like, if used herein, do not necessarily denote any particular order, quantity, or importance, but are used to distinguish one element from another. Terms such as "top", bottom", "upper", "lower", and the like, if used herein, are for descriptive purposes only and are not to be construed as limiting. Embodiments may be manufactured, used, and contained in a variety of positions and orientations.

In the foregoing Detailed Description, various features are grouped together for the purpose of streamlining the disclosure. This method of disclosure is not to be interpreted as reflecting an intention that the claimed embodiments of the invention require more features than are expressly recited in each claim. Rather, as the following claims reflect, inventive subject matter may lie in less than all features of a single disclosed embodiment. Thus the following claims are hereby incorporated into the Detailed Description, with each claim standing on its own as a separate preferred embodiment.

While certain exemplary embodiments have been described above and shown in the accompanying drawings, it is to be understood that such embodiments are merely illustrative and not restrictive, and that embodiments are not restricted to the specific constructions and arrangements shown and described since modifications may occur to those having ordinary skill in the art.

What is claimed:

1. A composition comprising:
   a block copolymer matrix comprising polystyrene and polybutene; and
   a filler positioned in the copolymer matrix, the filler comprising carbon;
   wherein the block copolymer matrix comprises 40 to 60 volume percent polystyrene and 40 to 60 volume percent polybutene.

2. The composition of claim 1, wherein the filler is selected from the group consisting of graphite, graphene, and carbon nanotubes.

3. The composition of claim 1, wherein the copolymer matrix is present in the composition in an amount ranging from 30 volume percent to 90 volume percent.

4. The composition of claim 1, wherein the copolymer matrix is present in the composition in an amount ranging from 50 volume percent to 70 volume percent.

5. The composition of claim 1, wherein the filler comprises a fiber that extends from a first end of the matrix to a second end of the matrix.

6. An assembly including the composition of claim 1 positioned between a die and a heat spreader.

7. A composition comprising:
   a polymeric matrix comprising a first component selected from the group consisting of polystyrene and a styrene derivative, and a second component comprising polybutene;
   the polymeric matrix including a first end and a second end opposite the first end; and
   a filler positioned in the polymeric matrix, the filler comprising carbon, the filler further comprising a plurality of fibers each extending from the first end to the second end of the polymeric matrix.

8. The composition of claim 7, wherein the first component comprises polystyrene.

9. The composition of claim 7, wherein the styrene derivative is selected from the group consisting of 2-methyl-1-phenyl-1-propene, α-methylstyrene, allylbenzene, and methylstyrene.

10. The composition of claim 7, wherein the polymeric matrix comprises a block copolymer comprising the first component and the second component.

11. The composition of claim 7, wherein the filler is selected from the group consisting of graphite, graphene, and carbon nanotubes.

12. The composition of claim 7, wherein the polymeric matrix is present in the composition in an amount ranging from 30 volume percent to 90 volume percent.

13. The composition of claim 7, wherein the polymeric matrix is present in the composition in an amount ranging from 50 volume percent to 70 volume percent.

14. The composition of claim 7, wherein the first component and the second component are each present in the polymeric matrix in an amount ranging from 40 volume percent to 60 volume percent.

15. An assembly including the composition of claim 7 positioned between a semiconductor die and a heat spreader, wherein the first end of the polymeric matrix is positioned adjacent to the semiconductor die and the second end of the matrix is positioned adjacent to the heat spreader.

16. A method comprising:
   providing a first component comprising at least one material selected from the group consisting of polystyrene and a styrene derivative;
   providing a second component comprising polybutene;
   combining the first component and the second component to form a matrix material, wherein the first component and the second component are combined so that the matrix material comprises 40 to 60 volume percent of the first component and 40 to 60 volume percent of the second component; and
   combining the matrix material with a filler comprising carbon.

17. The method of claim 16, wherein the combining the first component and the second component comprises forming the matrix material to comprise a block copolymer.

18. The method of claim 16, wherein the first component comprises polystyrene.

19. The method of claim 16, wherein the styrene derivative is selected from the group consisting of 2-methyl-1-phenyl-1-propene, α-methylstyrene, allylbenzene, and methylstyrene.

20. The composition of claim 1, wherein the filler comprises graphite in the shape of particles.

21. The composition of claim 1, wherein the filler comprises a ceramic.

22. The composition of claim 16, further comprising positioning the matrix material with the filler between a die and a heat spreader, wherein the filler includes a plurality of vertically aligned fibers positioned to each extend from a first end of the thermal interface material adjacent to the die to a second end of the thermal interface material adjacent to the heat spreader.

* * * * *